United States Patent [19]

Niederer, Jr. et al.

[11] E Re. 29,869

[45] Reissued Dec. 26, 1978

[54] PINCER MECHANISM FOR PIPELINES

[76] Inventors: Edward Niederer, Jr., 19117 1st Northwest, Seattle, Wash. 98177; James B. Ledford, 215 N. 56th Ave., Yakima, Wash. 98902

[21] Appl. No.: 833,604

[22] Filed: Sep. 15, 1977

Related U.S. Patent Documents

Reissue of:

[64] Patent No.: 3,905,219
Issued: Sep. 16, 1975
Appl. No.: 511,190
Filed: Oct. 2, 1974

[51] Int. Cl.[2] ..... B21D 7/06
[52] U.S. Cl. ..... 72/450; 72/453.03
[58] Field of Search ..... 72/450, 470, 48, 386, 72/410, 412, 451, 369, 475, 453.03; 228/3, 44

[56] References Cited

U.S. PATENT DOCUMENTS

| | | | |
|---|---|---|---|
| 2,461,034 | 2/1949 | Castle | 72/453 |
| 2,858,537 | 11/1958 | Cootes | 72/451 |
| 3,260,098 | 7/1966 | Gill | 72/470 |
| 3,263,465 | 8/1966 | Way | 72/48 |
| 3,730,478 | 5/1973 | Burke | 72/470 |

*Primary Examiner*—Lowell A. Larson
*Assistant Examiner*—Gene P. Crosby

[57] ABSTRACT

Pipe pincer mechanism for connection to and disconnection from a machine such as a back hoe for rapid shut down of a pipeline that has developed a break or leak. After the leak has been located and a hole or trench excavated to expose the break, the pincer mechanism is attached to the back hoe boom and one of the machine's hydraulic cylinders and then is used to crimp the pipe on both sides of the leak to shut off the escape of gas or liquid through the break.

17 Claims, 4 Drawing Figures

PINCER MECHANISM FOR PIPELINES

Matter enclosed in heavy brackets [ ] appears in the original patent but forms no part of this reissue specification; matter printed in italics indicates the additions made by reissue.

BACKGROUND OF THE INVENTION

This invention relates to the emergency shut down of a section of pipeline and more particularly to a pincer mechanism which is used to crimp pipe on both sides of a break or leak.

Those skilled in the art are aware of the problem of time involved in shutting down a section of pipeline that has developed a break or leak. The gas or liquid in the line is always potentially dangerous and therefore it is important if not critical that the break be isolated and shut off at the earliest possible moment. One current practice is to close the nearest valves in the system on either side of the break in the line. Since the valves in the line may be as much as 15 miles apart, depending upon population density, a substantial amount of damage may be done before the valves can be closed. Also a number of customers may suffer a stoppage or outage if the section shut down is large. Another practice for stopping the leakage is to attach fittings on both sides of the break with which the flow can be stopped or plugged. This also requires time and is dangerous for the workman. Hydraulic hand pumps are also known by which the pipe is crimped but this sort of approach is at least a two man operation and the pressure range and pipe sizes of the hand pumps is quite limited. In any event, a hole or trench must be dug to expose the break which requires 15 to 30 minutes to excavate with a back hoe. Nevertheless, utilities such as gas companies are criticized for the length of time required to close off the leakage and frequently also criticized for the size of the section or length of pipe which is shut down. If the fluid escaping from the pipe is liquid the tendency for the liquid to wash away supporting soil and undermine pipe support increases the danger to workmen. The fact that workers may be required down in the hole or trench is always dangerous whether the escaping fluid is liquid, gas or other vapors.

SUMMARY OF THE INVENTION

The pincer mechanism comprises a pair of spaced apart frame members adapted to be received on any conventional back hoe boom after the bucket of the back hoe has been taken off. The pincer mechanism is connected to the boom by the insertion of two pins extending through the side frame members of the pincer and the boom itself. An actuator arm is pivotally connected to the upper part of the frame structure and a lower jaw or blade arm is pivotally connected to the inner end of the upper pull arm. The lower arm in turn is connected to a movable jaw member. A stationary jaw member is spaced below the movable jaw so that when the boom hydraulic cylinder is connected to the outer end of the upper pull arm the upper jaw member can be forced down to crimp the pipe. Blade retainers or guides are provided to hold the movable jaw member in a generally vertical up and down path.

Accordingly, it is among the many features, advantages and objects of this invention to provide a pipe pincer mechanism which is simple, inexpensive to construct and rugged. The mechanism is designed so that after the hole or trench is dug it can be rapidly connected to the back hoe boom with the same pins that hold the bucket. With this mechanism no workmen are required in the trench and no large auxiliary equipment is needed other than the trailer in which the back hoe is carried. The device requires only one man and that is the back hoe operator. The bucket of the back hoe can be rapidly disconnected and the pincer connected with two pins to the boom and pin to the boom hydraulic cylinder. Because of the nature of the mechanism the pipe can be squeezed off on both sides of the break in approximately 1 minute. The device is fully operable on steel, copper or plastic mains of ½ inch to 8⅝inches outside diameters having up to ⅝ inch thickness walls. The mechanism as stated above utilizes the back hoe hydraulic system so that no separate power source is required. Safety is greatly enhanced because of the speed by which the mechanism can close off the leak and the fact that no workman must climb down into the hole. Less cost is involved with the mechanism because of the reduced manpower requirement. The mechanism will handle all of the breaks in populated business and residential areas in sizes up to 8⅝ inches outside diameter. There is no waiting for fittings if they are not readily available. Because of the speed of the device the inconvenience to customers is reduced because the outrage time is reduced. The mechanism cuts down on the amount of gas or liquid which is lost through the break and it gives complete shut off in two or three locations, if necessary, as for instance, if a seam opens at the first crimp. It can in fact be a control device in that the pipe can be partially pinched down thus reducing pressure so that a clamp can be put on. In this way the pipe is not necessarily completely closed off by the crimping action of the pincer. The device will have as much advantage for water districts and utilities as it does for natural gas companies because of the damage water under pressure from a broken main can cause. In the case of steel pipes which are concrete coated the device breaks the concrete and crimps the steel. The device will work regardless of the internal pressure in the pipes. The mechanism adapts to any back hoe and the actuator arm may be operated with something other than hydraulics. It can be used to grip pipe as for lifting and the like.

DESCRIPTION OF PREFERRED EMBODIMENT

Figure 1:
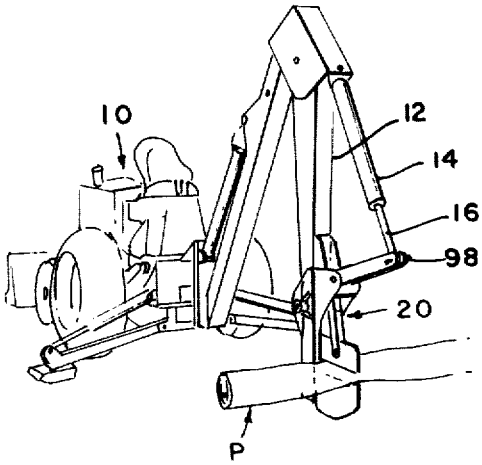
FIG. 1 is an environmental view in perspective showing the device connected to a back hoe boom and in the process of crimping a section of pipe.

FIG. 1 shows back hoe 10 with boom 12 and cylinder 14 with piston rod 16, which boom and cylinder normally carry a detachable bucket as with all conventional back hoe machines.

Figure 2:
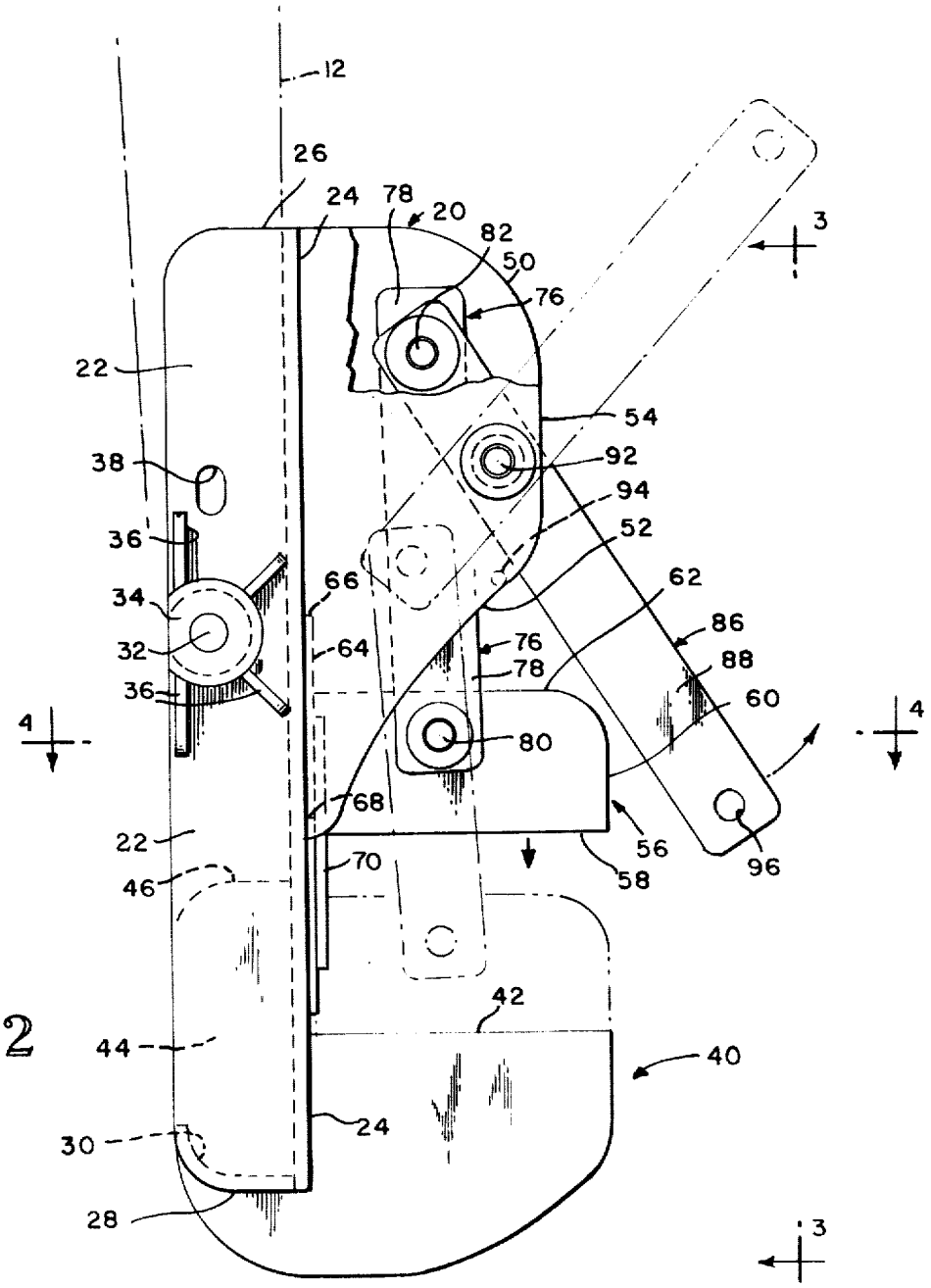
FIG. 2 is a side elevational view with some portions broken away illustrating details of the mechanism.
Figure 3:
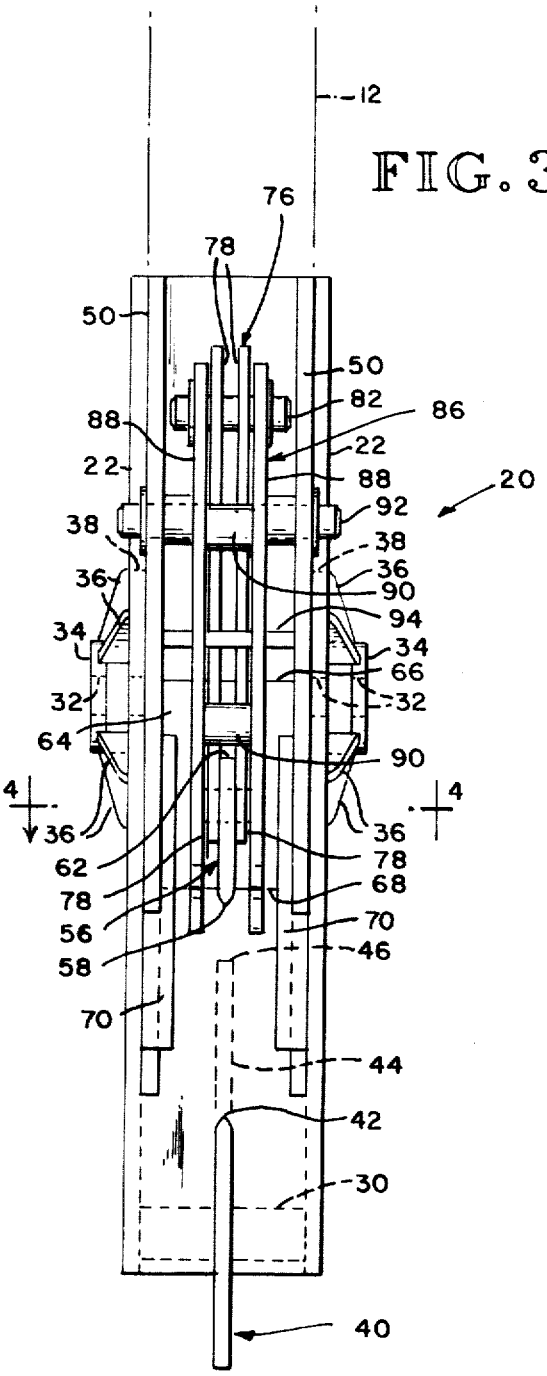
FIG. 3 is a front elevation view taken along the line 3—3 of FIG. 2 and further illustrating details of its construction.
Figure 4:
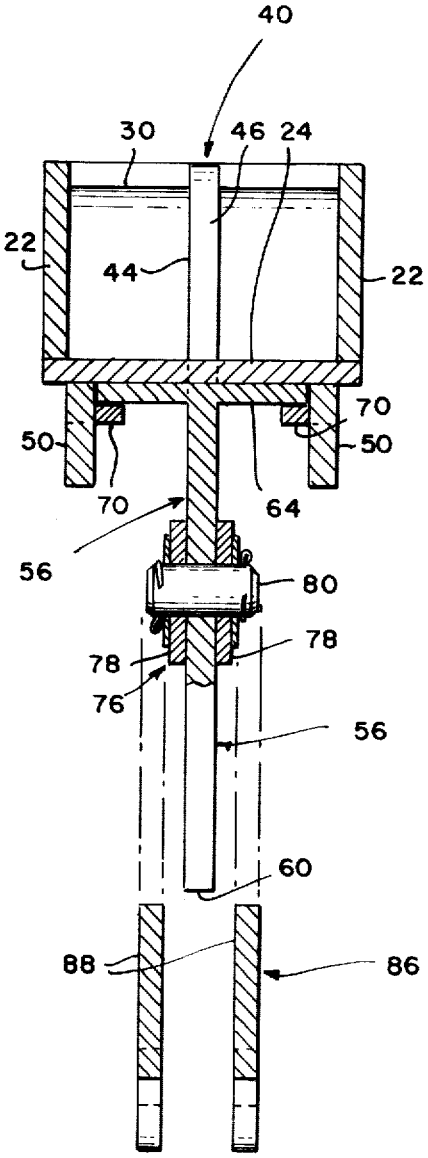
FIG. 4 is a cross sectional view in plan taken along the lines 4—4 of FIGS. 2 and 3 showing additional details of construction.

The pincer mechanism is generally designated by the number 20 and comprises elongated side frame members 22 and a front frame member 24 attached at its outer ends to the two side frame members 22 as best seen in FIGS. 2 and 4. The frame has upper end 26 and lower end 28 which is provided with a curved lower end plate 30 which, as will be explained hereinafter, is provided with a slot for receiving the lower stationary blade to be described more fully hereinafter. Slightly above the center of the length of the pincer mechanism in both side frame members 22 is a hole 32 which extends not only through each of the side frame members 22 but also through a raised boss member 34 on each side for receiving a detachable mounting pin. The raised boss member 34 has a plurality of stiffeners 36 disposed therearound for the primary support of the pincer mechanism 20 on boom 12. Spaced above boss member 34 is a slightly elongated opening 38 extending through both side frame members 22 to receive another boom mounting pin. The openings 38 are aligned and are elongated for differences in distances between the center lines of the mounting holes in the booms of back hoes. Thus variations in the spacing between pin holes does not prevent the pincer mechanism from being mounted on the booms.

The stationary blade, generally designated by the number 40, is located at the lower end of the frame members and has a pipe engaging edge 42 which as can be seen is centered to extend outwardly from front frame member 24. The stationary blade extends downwardly below the bottom end 28 of the frame members and is disposed in the slot in lower plate 30. It has a back or rear mounting section 44 which as can be seen has an upper edge 46 located approximately one-quarter the distance up from the bottom edge 28. It is secured as by welding to the surfaces of the front frame member 24 and to plate 30 and the back edge of mounting portions 44 is generally flush or even with the two rear edges of side frame members 22.

A pair of spaced apart mounting plate members 50 are mounted on the front surface of front frame members 24 and extend in the shape shown downwardly generally to below the center of the frame members 22 and 24. It can be seen that the lower portion of the plates 50 have inwardly and downwardly angled edges 52 and that such mounting plates have outer edges 54. A movable blade assembly generally designated by the number 56 is substantially rectangular in shape and has blade edge 58, outer edge 60 and top edge 62. The inner end of the movable blade is welded to slide plate 64 having an upper edge 66 and a lower edge 68. Slide plate 64 is held in place by retainers 70 spaced outwardly from the front surface of front frame member 24 to provide guide slots within which slide plate 64 may move upwardly and downwardly.

Movable blade assembly 56 is actuated by a lower arm generally designated by the number 76. It is comprised of a pair of spaced apart arm sections 78, the spacing of which is determined by spacers between the sections 78 which are not shown. The lower end of lower arm 76 is pivotally attached as by pin 80 to blade assembly 56, and the upper end of which is pivotally attached to an upper arm by pin connection 82. The upper arm assembly generally designated by the number 86 has spaced apart arm sections 88 which are held relative to each other by spacers 90. The arm sections 78 of the lower arm assembly 76 are closer together than the arm sections 88 of upper arm 86. Upper arm 86 is pivotally mounted between mountings plate 50 by pin 92. A brace rod 94 serves to keep the mounting plates 50 rigidly spaced and secured with one another.

When the upper arm 86 is in the lowered position as shown in FIG. 2 the lower arm assembly is raised together with blade 56. The outer end of upper arm 86 has holes 96 for receiving a detachable pin 98 (shown in FIG. 1) so that when the piston rod 16 is drawn upwardly by cylinder 14 upper arm 86 pivots about pin 92 to force lower arm 76 and blade assembly 56 downwardly into the fully descended position shown in dash dot lines. The leverage generated by the arm as actuated by the back hoe cylinder imparts substantial forces between the two blades as a result of which pipe P, also shown in FIG. 1, is crimped between the blades. It will be appreciated that pipe P may be plastic, or copper as well as steel concrete encased steel.

What is claimed is:

1. A pipe pincer mechanism for rapid attachment to and detachment from a back hoe boom, comprising:
   a. an elongated support frame with upper and lower ends having means for detachably securing said supporting frame to said back hoe boom,
   b. a pair of spaced apart mounting plates secured to said support frame,
   c. an elongated upper blade arm pivotally mounted between said mounting plates outwardly of said supporting frame, said upper arm having an inner end and also an outer end for attachment to a power means for pivoting said upper arm about its mounting pivot for a predetermined distance,
   d. an elongated lower blade arm having an upper end pivotally attached to the inner end of said upper arm also having a lower end,
   e. a movable blade assembly including a generally vertically disposed blade attached to the lower end of said lower arm, and
   f. a generally vertically disposed fixed blade located generally at the lower end of said supporting frame and between which fixed blade and movable blade pipe may be crimped when said upper arm is pivoted upwardly to force said movable blade assembly downwardly.

2. The pipe pincer mechanism of claim 1 wherein said means for detachably securing said frame to said boom comprises removable pin means.

3. The pipe pincer mechanism of claim 1 and in which said lower blade arm is pivotally secured to said vertically disposed blade means.

4. The pipe pincer mechanism of claim 1 and in which said upper and lower blade arms are generally elongated, rectangularly shaped flat bar sections, each of which blade arms is made of double, spaced apart flat bar sections.

5. The pipe pincer mechanism of claim 1 and in which said mounting pivot for said upper blade arm is closer to the inner end thereof than to the outer end such that the lower blade arm is disposed generally vertically and moves also generally vertically.

6. The pipe pincer mechanism of claim 1 and wherein said movable blade assembly includes a slide plate to which said blade is secured.

7. The pipe pincer mechanism according to claim 6 and in which retainer guide means are attached to the inner side of said mounting plates for holding said slide plate in slidable relationship with said elongated supporting frame member.

8. The pipe pincer mechanism of claim 1 wherein said support frame includes a front plate member and two side plate members to define a generally square U-shaped support frame with said mounting plates being secured to said front plate member.

9. The pipe pincer mechanism of claim 8 and wherein said support frame includes generally axially aligned pin holes in said side plate members which register with openings in said hoe boom for detachable mounting of said support frame on said boom by removable pin means.

10. The pipe pincer mechanism of claim 9 and wherein there are at least two sets of axially aligned pin holes in said side plate members with predetermined spacing at least one of which sets is provided with rigidizing and strengthening structure means.

*11. A pipe pincer mechanism for rapid attachment to and detachment from a back hoe boom, comprising:*

*a. an elongated support frame with upper and lower ends having means for detachably securing said supporting frame to said back hoe boom,*

*b. pivot mounting means operably attached to said supporting frame for pivotal support of an upper blade arm,*

*c. an elongated upper blade arm pivotally mounted on said pivot mounting means and having an inner end and also an outer end for attachment to a power means for pivoting said upper arm about its mounting pivot for a predetermined distance,*

*d. an elongated lower blade arm having an upper end pivotally attached to said upper arm and also having a lower end,*

*e. a movable blade assembly including a generally vertically disposed blade pivotally attached to the lower end of said lower arm, and*

*f. a generally vertically disposed fixed blade located generally at the lower end of said supporting frame and between which fixed blade and movable blade pipe may be crimped when said upper arm is pivoted to force said movable blade assembly downwardly.*

*12. The pipe pincer mechanism of claim 11 and wherein said means for detachably securing said frame to said boom comprises removable pin means.*

*13. The pipe pincer mechanism of claim 12 and wherein said movable blade assembly includes a slide plate to which said blade is secured.*

*14. The pipe pincer mechanism according to claim 13 and in which retainer guide means are attached to the supporting frame for holding said slide plate in slidable relationship with said elongated supporting frame.*

*15. The pipe pincer mechanism of claim 14 and wherein there is at least one set of axially aligned pin holes in said supporting frame member with predetermined spacing and which set is provided with rigidizing and strengthening structure means.*

*16. The pipe pincer mechanism of claim 11 wherein said support frame includes a front plate member and two side plate members to define a generally square U-shaped support frame with said mounting plates being secured to said front plate member.*

*17. The pipe pincer mechanism of claim 16 and wherein said support frame includes generally axially aligned pin holes in said side plate members which register with openings in said hoe boom for detachable mounting of said support frame on side boom by removable pin means.*

* * * * *